Figure 1:
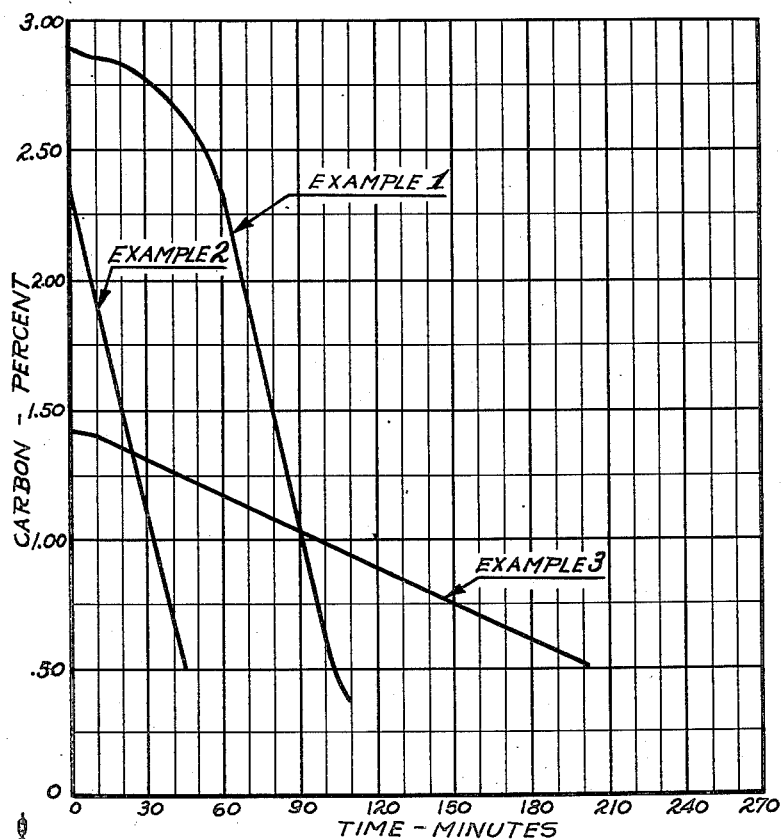

Sept. 26, 1950      H. W. McQUAID      2,523,475

METHOD OF REDUCING THE CARBON CONTENT OF STEEL

Filed March 14, 1950

INVENTOR.
HARRY W. McQUAID
BY
Richey & Watts
ATTORNEYS

Patented Sept. 26, 1950

2,523,475

UNITED STATES PATENT OFFICE 2,523,475

METHOD OF REDUCING THE CARBON CONTENT OF STEEL

Harry W. McQuaid, Shaker Heights, Ohio, assignor to Republic Steel Corporation, Cleveland, Ohio, a corporation of New Jersey Application March 14, 1950, Serial No. 149,492

2 Claims. (Cl. 75—51)

The present invention relates generally to the art of refining metals and is particularly concerned with a novel method of decarburizing ferrous metals.

In the production of steel from relatively high carbon iron, Bessemer, open hearth and electric furnaces are used to reduce undesired ingredients or elements. The most important of these elements is carbon. In the Bessemer furnace, carbon is oxidized by gaseous oxygen which is delivered either beneath or onto the surface of molten metal. Oxidation of the impurities in the Bessemer furnace proceeds at an uncontrolled rate and a considerable quantity of iron is oxidized and lost in the process. The carbon content of Bessemerized metal consequently cannot be predetermined above a certain minimum and it is necessary to add carbon to the metal after it has been removed from the furnace, if more than said minimum is desired. This carbon addition, however, does not result in removal from the steel of undesirable nitrogen absorbed by the steel before such additions and when the carbon content of the metal is below about 0.10%. In the open hearth furnace, silicon and manganese are oxidized before carbon by oxygen delivered into the molten metal as iron oxide. However, availability of external heat to maintain metal temperatures enables operation at lower temperatures in the open hearth than in the Bessemer and permits decarburization at a controlled rate and to a controlled extent. But the open hearth process is very slow compared to the Bessemer process and is more expensive to operate.

The course of the reactions involving the oxidation of silicon, manganese and carbon in the electric furnace is substantially the same as in the open hearth and Bessemer, but due to the fact that heating in the electric furnace is much more expensive and the reactions between oxides of iron and carbon are strongly endothermic, it usually is not practicable to process metal containing relatively high percentages of carbon in the electric furnace. The utility of the electric furnace is consequently limited although it has a number of obvious and potentially important advantages over both other types of steel producing furnaces. The electric furnace, for instance, cannot be incorporated commercially in a steel producing operation with a blast furnace or cupola to convert such material into highest grade steel despite its ability.

By virtue of the present invention it is now for the first time possible to produce the highest quality steel economically from pig iron and high carbon scrap in the electric furnace, and it is possible to do this under circumstances such that steel of practically any desired carbon content can be produced. The process of this invention does not depend upon the use of iron ore; and unlike the Bessemer process, does not require high silicon pig iron or scrap, which is more expensive than low silicon metal. Furthermore, in contrast to prior practices, the present method does not involve the introduction of siliceous matter into the furnace, and therefore does not result in the introduction of refractory nonmetallic inclusions into the metal or in the production of a large volume of slag beyond that which would be produced as a result of oxidation of the silicon, manganese, etc., in the metal charged into the furnace. Another advantage of this process is that it results in a substantial net increase of heat in metal treated, and enables operation of the furnace for protracted periods without electric power to maintain the temperature of metal at the desired level. In the course of removing carbon from a melt in accordance with this invention, the chemical heat input to the melt may fall so that it becomes desirable to apply heat, as by the arc in electric furnace or the flame in the open hearth furnace. This is in contrast to Bessemer practice in which the entire heat of the process is generated by chemical reaction in the furnace.

A further advantage of this process is that it is conducive to improved quality metal, especially in the electric furnace, because of its tendency to eliminate undesired hydrogen, due to the stirring action of the gaseous carbon oxides evolved, and because carbon elimination is effected without the addition of solid oxides of high melting point. These oxides are associated with other refractory materials which may appear as undesirable inclusions in the final products. It is especially adapted to the making of the highest quality steel in the basic electric furnace by the removal of any slag incidental to the oxidation of carbon and its replacement by a highly basic slag which permits the production of steel of any desired chemistry. The oxide, sulfide, and phosphide content of melts in such a basic furnace can be reduced to meet any commercial specifications.

The present invention is predicated upon my surprising discovery that not only can carbon be effectively oxidized and removed from high carbon ferrous metal in an electric furnace under controlled conditions so that a product of any desired quality can be obtained, but also such conversion and purification can be effected in a manner which is economical and has all the important advantages above enumerated.

This invention, of course, is applicable to the open hearth as well as the electric furnace, although it applies more favorably to the former. Advantages in its application to open hearth furnace include conservation of fuel due to the substantial net exothermic effect of the process, reduction of slag volume, and increased rates of carbon oxidation and removal without loss of control over the reactions resulting in oxidation of the carbon.

Briefly stated, the process of this invention comprises the steps of contacting with iron oxide molten ferrous metal having a carbon content greater than a certain desired amount, then blowing a stream of oxygen-containing gas in contact with the molten metal and thereby removing carbon from the metal as gaseous carbon oxide at a rate less than about 0.20% per minute, discontinuing contact of the gas stream with the metal before the carbon contact of the metal has been reduced to said desired amount, and subsequently terminating reaction of iron oxide with carbon of the molten metal when the carbon content of said metal has been reduced to approximately the said desired amount.

Herein and in the appended claims the terms "melt" and "bath" are used in the manner familiar to the art, and respectively connote "molten metal" and "molten metal and slag."

In the application of this process to the electric furnace, I have found it desirable to charge molten iron into the furnace, but it is possible and economically feasible, if molten iron is not obtainable, to charge cold iron into the furnace. Cold metal practice in the electric furnace results in rapid deterioration and destruction of electrodes due to the high power required and the abrasive action of pieces of metal on the electrodes during the melting down operation. Preferably, therefore, the electric furnace is incorporated in a system including either a blast furnace or a cupola in such a manner that hot metal therefrom may be charged directly into the electric furnace and processed in accordance with this invention to produce the desired decarburization result. In this operation less expensive charge metal turnings and borings of pig iron and like high carbon materials may be employed.

In both the electric furnace and the open hearth, iron oxide is, in accordance with this invention, charged into the furnace in this preliminary stage of the process in order to assure the presence of iron oxide in the molten bath when the oxygen-containing gas is blown into contact with the molten metal later on. The iron oxide may be in the form of iron ore, but preferably should be mill scale or the like, the addition of which involves the introduction into the melt of a minimum amount of siliceous matter. In the better practice, a small excess of such iron oxide over that chemically equivalent to the silicon, phosphorus and manganese should be employed to assure saturation of the bath therewith so that iron oxide will not have to be produced in the furnace by the oxygen from the air blast for oxidation of said silicon, phosphorus and manganese.

As soon as a bath is formed in the furnace and any slag present as an overlying layer is sufficiently fluid, air in the form of an air stream is brought into contact with the surface of the molten metal to produce iron oxide for reaction with the carbon of the melt. The air stream should be disposed at an angle between about 10° and 20° to the surface of the bath and for most effective air-metal contact should be at an angle of about 15° to said surface. A plurality of air streams may be directed against the bath surface, that is, the slag surface, and into contact with a portion of the surface of the metal, but ordinarily sufficiently rapid decarburization will be effected by means of one or two air streams developing a relatively small area of air-metal contact in an electric furnace of average size. In an open hearth furnace, where larger volumes of metal are treated and the demands for iron oxide to oxidize the carbon of the melt is correspondingly greater, the number of air streams is preferably greater, but the extent of air-metal contact developed by each air stream may suitably be substantially the same as in the electric furnace. The rate of flow of the air stream in either case is not particularly critical or important, so long as exposure of the metal to air is accomplished to such an extent that iron oxide is generated rapidly enough that decarburization proceeds at a satisfactory rate. Instead of blowing the air onto the surface of the molten metal, it may be introduced beneath that surface by means of a protected jet which may be at any desired depth.

In general, any oxygen containing gas is satisfactory for this production of iron oxide in the molten metal for decarburizing purposes so long as the gas does not contain substances having a deleterious effect on metal to a material extent upon such surface contact as results from the air stream-metal contact. Pure oxygen, for instance, may be employed, but from the standpoint of economy, air or air enriched with oxygen is more to be desired.

External heat may be applied constantly during the decarburization operation, or preferably intermittently, to maintain the melt and slag temperature and viscosity at predetermined desired values. In electric furnaces this is accomplished by means of the electric arc, and in the open hearth, by means of the heating flame. Due to the exothermic heat of the reaction between silicon and iron oxide and the reaction between the resulting carbon monoxide and oxygen in the atmosphere above the melt, the application of external heat to the melt is not necessary during most of the decarburization period. Careful control over the melt temperature is easily maintained during the course of decarburization and whenever the temperature reaches a predetermined minimum, external heat is applied to arrest its descent.

The rate of decarburization depends upon temperature, the rate being greater with higher temperatures. The rate of formation of iron oxide by reaction of iron in the melt with air contacting the surface of the melt also has an important bearing upon the rate of carbon removal. Therefore, control of the rate and extent of carbon removal from the melt in either the electric furnace or open hearth is readily effected by controlling the volume and rate of flow of the air stream and the heat input to the melt. By manipulation of either or both these variables it is readily possible to reduce the carbon in the metal at practically any desired predetermined rate, and it is possible to alter this rate.

The volume and rate of flow of the air stream and the extent of air-metal contact should be maintained within certain limits so that the ratio of oxidized iron to that required for carbon removal is under control. Failure to thus limit the oxidation of iron, especially in the later stages of carbon removal, will result in the reaction between carbon and iron oxide proceeding at a very rapid rate and will make effective control over the course of the reaction substantially impossible, or at least, substantially more difficult than it would otherwise be. I have found that the carbon-iron oxide reaction may conveniently be controlled by furnishing less than the theoretical amount of oxygen required to maintain an excess of oxidized iron in the bath at any time, due consideration being given to the efficiency of the iron oxide production operation. This however, results in a decrease in the chemical heat input to the bath and consequently results in a decrease in metal temperature. Thus, for full control over the reaction of carbon oxidized iron in this manner, it is ordinarily desirable to apply external heat to maintain the temperature of the bath at a sufficiently high level for good reaction and slag fluidity. In alternative practice, the air stream may be intermittently applied to the metal and external heat, such as the heating flame in the open hearth or the arc in the electric furnace, may be applied as required to maintain the carbon removal reaction at the desired rate and the temperature of the bath at the desired level. The rate and volume of air stream flow in contact with the metal, and the extent to which external heat is applied to the metal will vary from heat to heat and will depend upon the point at which carbon removal is to stop, and also upon the quality and type of steel to be produced.

I have found in practice that good control over the courses of decarburization can be maintained if the rate is less than 0.1% per minute for the last 90% of the carbon of the melt, when the rate of carbon removal is of most importance. A good operating range of rates is 0.03% to 0.10% of carbon per minute. A higher rate may be desirable in certain heats for the last 90% of the carbon to be removed, but preferably such a rate should not exceed about 0.2%. On the other hand, a rate as low as 0.01% of carbon per minute may be satisfactory in some commercial operations.

When the melt has been decarburized to a point approaching the final desired carbon content, contact between the air stream and the molten metal is discontinued in any convenient manner as by shutting off the air stream. By following the progress of the decarburization reactions, i. e., checking the carbon drop, one can determine sufficiently well for all practical purposes the time when air metal contact should be discontinued. The finishing stage of the process thus will involve decarburization of the metal by means of residual iron oxide in the molten metal and consequently will amount to a "coasting-in" step. Normally, in commercial operations, this "coasting" period will go on for a matter of 5 to 15 minutes depending upon the temperature of the molten metal and the amount of iron oxide produced in excess over that consumed during the prior air-metal contacting operation. It will be understood however, that this coasting period may be shorter or substantially longer than the period stated by way of example, and that the length of this period may be regulated to suit the desires of the operator as outlined above.

Usually, as soon as the coasting period is begun, heat is applied to the melt to compensate for the loss of exothermic heat as the iron oxidation reaction ceases and to compensate also for the strongly endothermic effect of the iron oxide-carbon reaction which brings the carbon content of the metal down to the final desired value. This practice of applying external heat to the melt at this stage of the process is favored as standard procedure in commercial operations because it is necessary for best results, there being no considerable excess of heat normally put into a ferrous metal melt of this type in the earlier stages of processing.

The air pressure which is desirable will vary with nozzle size but when the pressure is between about 2 and about 10 lbs. per square inch in the supply line, a nozzle delivering between about 100 and about 450 cu. ft. of air per minute per ton of ferrous metal in the melt, will be satisfactory. A rate of carbon removal from the melt less than 0.1% per minute can be attained by such means.

This process is equally applicable to the basic furnaces, such as a basic lined electric furnace, as it is to acid furnaces. In the basic furnace a basic addition of limestone, dolomite, or the like, may be made when the metal is charged into the furnace, or at some subsequent time. The resulting basic slag preferably has a controlled basicity so that it is not too viscous at the decarburization temperature. Operation in accordance with the foregoing practice of this invention in the basic furnace will result in dephosphorization and desulfurization as well as decarburization and it is accordingly possible to produce in this manner high quality steel having phosphorus and sulfur contents below 0.04%. Normally, however, all the phosphorus and sulfur of a metal charge will not thus be removed even if said metal contains only relatively small quantities of these impurities.

The following examples, which are illustrative only and are not to be construed as imposing limitations in any respect upon the appended claims, are offered further to inform those skilled in the art of the exact nature of this invention in several of its forms.

*Example I*

A melt comprising 10,000 pounds of scrap iron and 14,000 pounds of pig iron, and containing 2.97% carbon, 0.56% manganese, .46% silicon, .04% nickel, .09% aluminum, .03% molybdenum, was prepared in an electric furnace from a cold metal charge. With the electric arc on, air was blown into contact with the surface of the metal for a 45 minute period and then the arc was extinguished and the air blowing was continued for an additional hour. The arc was then again applied to the melt for a 10 minute period, after which the air blowing was continued for only 10 minutes. The carbon content of the metal at the end of the 125 minute period of air contact was about 0.6%. Then, with the air off and the arc on for approximately 15 minutes, the carbon content was reduced to about 0.4%.

Air was delivered into contact with the surface of the melt by a 39-inch hose under a pressure of 18 lbs. per square inch. A total of 2.5% carbon, which is equivalent to 50 pounds of carbon per ton of metal was removed using 840 lbs. of oxygen, or 52,000 cubic ft. of air. A total of 108,000 cubic ft. of air was blown into the furnace. The air efficiency therefore was approximately 48%.

Example II

A 12 ton heat comprising 60% pig iron and 40% steel scrap and having a carbon content of about 2.37%, was charged into an electric furnace and melted together with 1000 pounds of mill scale. Two hundred pounds of iron oxide ($Fe_2O_3$) was added to the first formed slag. An air stream was then applied to the surface of the melt for 40 minutes in accordance with the practice of Example I, and the carbon content was reduced to 0.6%. In the five minutes following, the carbon content was reduced to 0.5%. During this 45 minutes period a low power electric arc was applied to the melt from the 10th to the 20th minute and from the 32nd to the 37th minute.

Example III

A heat of 387,000 pounds of metal containing about 1.42% carbon was prepared in an open hearth furnace in a conventional manner from a charge consisting of 45% scrap and 55% hot metal. After iron ore was charged into the furnace to effect oxidation and removal of silicon, manganese and carbon, the metal was retained therein for a period of 200 minutes, at the end of which time the carbon content finally reached 0.5%. During the entire 200 minutes, heat was applied externally to the melt to offset the endothermic effect of the iron oxide-carbon reaction and maintain temperature of the melt sufficiently high to permit decarburization to proceed as rapidly as possible. This was a conventional commercial scale open hearth operation in every respect.

The courses of the decarburization reactions of these examples are illustrated in the curves appearing on the chart of Fig. 1, which accompanies and forms a part of this specification. It is to be expected that the course of decarburization reaction in the open hearth furnace should parallel that of the electric furnace, and that in accordance with Example 2, decarburization of the open hearth heat of Example 3 should be completed in approximately one-tenth the time usually required. Even assuming iron oxide is not charged into the furnace to accelerate decarburization, very substantial time saving can be effected by means of this invention in open hearth practice. Probably substantially complete decarburization would require little, if any, more time in the open hearth than in the electric furnace, assuming adequate air-metal contact, which could easily be obtained. Thus, probably only 60 minutes, or less than ⅓ of the total conventional open hearth decarburization period, would be required to effect removal of carbon to the usual extent from a typical open hearth melt.

In the course of this decarburization process, when air is blown into contact with a melt in the furnace, the slag or non-metallic bath coating is swept by the air stream from a portion of the metal and direct contact of the air with the surface of the metal is obtained. Under the proper temperature circumstances, rapid oxidation of iron takes place on that surface, and an extremely rapid removal of carbon follows reaction of carbon in the vicinity with the freshly produced iron oxide, the low-carbon area surrounding the oxidized iron in the vicinity where air and metal contact is made being constantly replenished in carbon by rapid diffusion of carbon from high carbon areas of the bath. Carbon removal from the molten bath as a gaseous oxide thus is rapid and continuous as long as both iron oxide and carbon are present therein and as long as temperature conditions favor the reaction.

Since there is no exothermic reaction between the ordinary slag coating and oxygen of the air stream, the first effect of blowing air in the metal is the appreciable reduction of the temperature of said coating. The reaction between oxygen of the air stream and iron in the bath, however, is highly exothermic and eventually more than compensates for this cooling effect of the air stream. Usually, however, it is desirable to apply external heat to the bath in the early stages of air-metal contact to assure proper slag viscosity and enables effective air-sweeping of the melt surface in the zone of air-metal contact.

Figure 2:
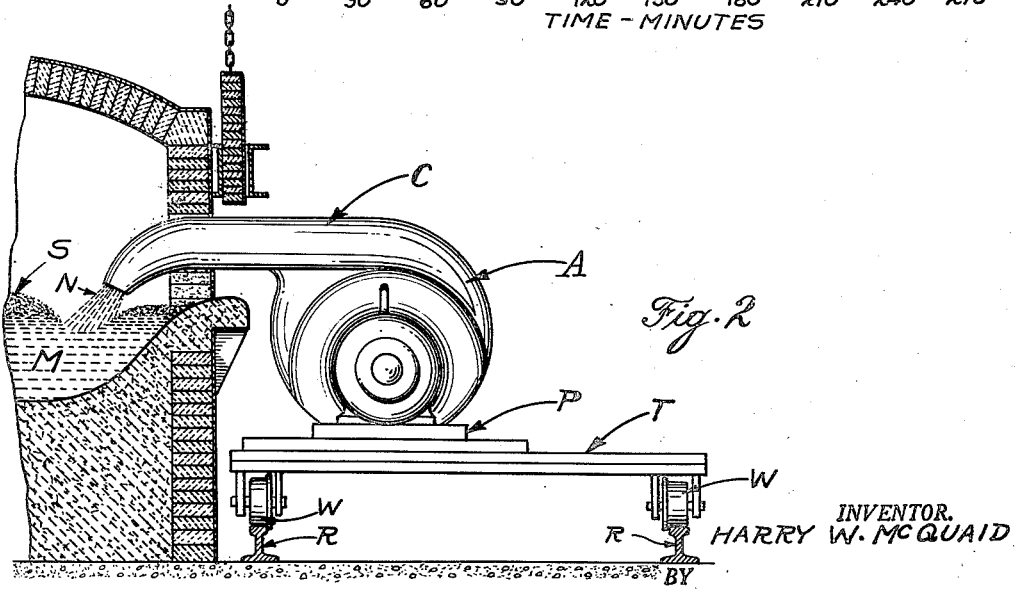

The air stream may be applied to the bath various ways, but I believe that a particularly satisfactory means comprises a portable blower assembly which may be moved from furnace to furnace or from door to door in the same furnace, as required. The device to which I refer is illustrated in Fig. 2 of the drawings accompanying and forming a part of this specification. This figure is a side elevational view of the device disposed in operating position in a furnace, a part of which appears in cross section.

This device comprises a truck T having wheels W to run on rails R paralleling the side of the furnace, a platform P on the truck, a motor driven air compressor assembly A on the platform, and a conduit C terminating a blower nozzle N disposed inside the furnace. With the door of the furnace open, as shown, the air stream is directed against the melt, brushing slag layer S aside and exposing a portion of the surface of the metal M to the stream. When the air stream is to be directed at another angle in the melt to contact another portion of the surface of the metal, truck T is moved or the nozzle N is turned to accomplish this result. Platform P is movably mounted on the truck so that it may be moved toward or away from the furnace to insert the nozzle into or withdraw it from the furnace.

This is a continuation-in-part of my application Serial No. 717,377, now abandoned, filed December 20, 1946, and pending as of March 14, 1950, when the present case was filed.

Having thus described the present invention so that those skilled in the art may be able to understand and practice the same, I state that what I desire to secure by Letters Patent is defined in what is claimed.

What is claimed is:

1. The method of rapidly and economically making ferrous metal having a predetermined carbon content which comprises the steps of contacting with iron oxide, molten ferrous metal having a carbon content greater than said predetermined amount, then blowing a stream of oxygen-containing gas in contact with the said molten metal and thereby removing carbon from the metal as gaseous carbon oxide at a rate less than about 0.20% of carbon per minute, discontinuing contact of the gas stream with the molten metal before the carbon content of said metal has been reduced to said predetermined amount, and subsequently terminating reaction of iron oxide with carbon of the molten metal when the carbon content of said metal has been reduced to approximately said predetermined amount.

2. The method of making a ferrous metal having predetermined carbon, phosphorus and sulfur contents which comprises the steps of charging into a furnace molten ferrous metal containing silicon and manganese and having carbon, phosphorus and sulfur contents greater than said predetermined amounts, charging into the furnace iron oxide containing an amount of oxygen sufficient to oxidize substantially all the silicon and manganese in said molten metal, blowing a stream of oxygen-containing gas in contact with the said molten metal and removing carbon from the metal as gaseous carbon oxide at a rate between about 0.03% and about 0.10% of carbon per minute, heating the molten metal and thereby maintaining its temperature above a predetermined minimum while the gas stream contacts the metal, discontinuing contact of the gas stream with the molten metal before the carbon content of said metal has been reduced to the said predetermined amount, and subsequently terminating reaction of iron oxide with carbon of the molten metal when the carbon content of said metal has been reduced to approximately said predetermined amount.

HARRY W. McQUAID.

REFERENCES CITED

The following references are of record in the file of this patent:

UNITED STATES PATENTS

| Number | Name | Date |
|---|---|---|
| 2,743 | Gustin | Aug. 2, 1842 |
| 412,768 | Ludlow | Oct. 15, 1889 |
| 586,047 | Last et al. | July 6, 1897 |
| 757,276 | Deemer | Apr. 12, 1904 |
| 1,032,653 | Brassert | July 16, 1912 |
| 1,430,878 | Ballantine | Oct. 3, 1922 |
| 1,946,873 | Neuhauss | Feb. 13, 1934 |

FOREIGN PATENTS

| Number | Country | Date |
|---|---|---|
| 156,548 | Great Britain | Apr. 5, 1922 |